(12) United States Patent
Han

(10) Patent No.: US 9,804,755 B2
(45) Date of Patent: Oct. 31, 2017

(54) CLUSTER APPARATUS FOR VEHICLE

(71) Applicant: Hyundai Motor Company, Seoul (KR)

(72) Inventor: Sangjae Han, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 518 days.

(21) Appl. No.: 14/460,126

(22) Filed: Aug. 14, 2014

(65) Prior Publication Data

US 2015/0177956 A1    Jun. 25, 2015

(30) Foreign Application Priority Data

Dec. 20, 2013    (KR) .................... 10-2013-0160443

(51) Int. Cl.
*G06F 3/048* (2013.01)
*G06F 3/0484* (2013.01)
*B60K 35/00* (2006.01)

(52) U.S. Cl.
CPC .......... *G06F 3/04842* (2013.01); *B60K 35/00* (2013.01); *G06F 3/048* (2013.01);
(Continued)

(58) Field of Classification Search
CPC .. G06F 3/0482; G06F 3/0488; G06F 3/04883; G06F 3/017; G06F 3/041; G06F 3/04817; G06F 3/04842; G06F 3/0485; G06F 3/016; G06F 3/03547; G06F 3/013; G06F 3/005; G08G 1/0112; G08G 1/012; G08G 1/123; G08G 1/09685
See application file for complete search history.

(56) References Cited

U.S. PATENT DOCUMENTS 5,913,918 A * 6/1999 Nakano ................. G01C 21/36
340/995.14
6,191,771 B1    2/2001 Kondoh
(Continued)

FOREIGN PATENT DOCUMENTS

JP          10-006810 A    1/1998
JP          2006-258783 A  9/2006

OTHER PUBLICATIONS

Ahtola et al., Dynamic Eye Tracking Based Metrics for Infant Gaze Patterns in the Face-Distractor Competition Paradigm; Published on May 20, 2014; https://doi.org/10.1371/journal.pone.0097299; 13 pages.*

*Primary Examiner* — Linh K Pham
(74) *Attorney, Agent, or Firm* — McDermott Will & Emery LLP

(57) ABSTRACT

A cluster apparatus for a vehicle includes a display panel of which a plurality of graphic entities corresponding to driving information, additional information, a background, and an edge are displayed on a display area including a driving information display area, an additional information display area, and a background display area. A vehicle state detector is configured to detect a dynamic characteristic of the vehicle to generate vehicle state information. A driver state detector is configured to detect a driver's eye on the vehicle to generate driver state information. A user interface (UI) changer is configured to change any one of the plurality of graphic entities and the display area according to a user mode selected, the vehicle state information, and the driver state information.

8 Claims, 10 Drawing Sheets

(52) U.S. Cl.
CPC  *B60K 2350/106* (2013.01); *B60K 2350/2008* (2013.01); *B60K 2350/908* (2013.01)

(56) References Cited

U.S. PATENT DOCUMENTS

| | | | |
|---|---|---|---|
| 6,968,510 B2* | 11/2005 | Yokota | G06F 3/0482 715/805 |
| 8,310,423 B2 | 11/2012 | Sato | |
| 2005/0285837 A1 | 12/2005 | Akimoto | |
| 2007/0150187 A1* | 6/2007 | Kawakami | B60K 35/00 701/431 |
| 2008/0046178 A1* | 2/2008 | Tava | G01C 21/3664 701/431 |
| 2008/0082231 A1* | 4/2008 | Okabe | G01C 21/26 701/33.4 |
| 2008/0309475 A1* | 12/2008 | Kuno | B60K 35/00 340/462 |
| 2009/0037093 A1* | 2/2009 | Kurihara | G01C 21/26 701/533 |
| 2009/0278677 A1* | 11/2009 | Arie | B60K 35/00 340/461 |
| 2009/0281727 A1* | 11/2009 | Nagatani | G01C 21/3688 701/414 |
| 2010/0145611 A1* | 6/2010 | Tokue | B60R 11/0235 701/532 |
| 2011/0025848 A1* | 2/2011 | Yumiba | B60R 1/00 348/148 |
| 2012/0013548 A1* | 1/2012 | Choi | B60K 35/00 345/173 |
| 2012/0215403 A1* | 8/2012 | Tengler | B60W 50/12 701/36 |
| 2012/0271484 A1* | 10/2012 | Feit | B60W 30/09 701/1 |
| 2013/0097557 A1* | 4/2013 | Madau | A61B 5/18 715/810 |
| 2013/0275924 A1* | 10/2013 | Weinberg | G06F 3/017 715/863 |
| 2014/0077942 A1* | 3/2014 | Jayamohan | B60K 35/00 340/441 |
| 2014/0132753 A1* | 5/2014 | Watanabe | B60R 1/00 348/116 |
| 2014/0160165 A1* | 6/2014 | Kim | G06T 19/006 345/633 |
| 2014/0229847 A1* | 8/2014 | Park | G06F 1/1684 715/744 |
| 2015/0009163 A1* | 1/2015 | Nakai | G01C 21/3664 345/173 |
| 2015/0010207 A1* | 1/2015 | Inada | B60K 35/00 382/103 |
| 2015/0347538 A1* | 12/2015 | Ohno | G06F 17/30 707/722 |

* cited by examiner

CLUSTER APPARATUS FOR VEHICLE

CROSS-REFERENCE TO RELATED APPLICATION

This application claims the benefit of priority of Korean Patent Application No. 10-2013-0160443 filed in the Korean Intellectual Property Office on Dec. 20, 2013, the entire contents of which are incorporated herein by reference.

TECHNICAL FIELD

The present disclosure relates to a cluster apparatus for a vehicle, and more particularly, to a digital cluster apparatus for a vehicle in which a user interface (UI) is changed in order to minimize a burn-in phenomenon of a liquid crystal display (LCD).

BACKGROUND

Generally, a cluster for notifying predetermined driving information to a driver is installed in front of a driver's seat of a vehicle. The cluster displays overall details of the vehicle, such as a mileage, a fuel state, an external temperature, fuel efficiency, and a tire pressure monitoring system (TPMS).

Recently, in the cluster of the vehicle, departing from a method of simply displaying meter information as a dial method, a digital method of displaying graphic meter information using a large thin film transistor-liquid crystal display (TFT-LCD) has been developed so as to provide better visibility and display more information.

In the case of using the liquid crystal display over a long time, a burn-in phenomenon in which an image display function deteriorates occurs. Particularly, the cluster apparatus of the vehicle is vulnerable to the burn-in phenomenon because the driving information is not frequently changed and displayed at a fixed position.

Generally, in a liquid crystal display applied to a personal computer (PC) environment, in the case where a computer is not used for a set period of time, the burn-in phenomenon is prevented by using a screen saver which continuously displays a predetermined image on the screen, or turning off power of the screen itself, or the like.

However, in the case where the cluster apparatus for the vehicle displays an image irrelevant to the driving information when driving the vehicle, or turning off the power of the screen, or the like, since the method may threaten safety of the driver, there is a limit to applying the same method in the PC environment.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a cluster apparatus for a vehicle having an advantage of preventing a burn-in phenomenon of a liquid crystal display panel.

According to an exemplary embodiment of the present disclosure, a cluster apparatus for a vehicle includes a display panel in which a plurality of graphic entities corresponding to driving information, additional information, a background and an edge are displayed on a display area including a driving information display area, an additional information display area, and a background display area. A vehicle state detector is configured to detect a dynamic characteristic of the vehicle to generate vehicle state information. A driver state detector is configured to detect a driver's eye on the vehicle to generate driver state information. A user interface (UI) changer is configured to change any one of the plurality of graphic entities and the display area according to a user mode selected by a driver, the vehicle state information, and the driver state information. The display panel may include a liquid crystal display panel.

The dynamic characteristic may include a speed, slope, and vibration of the vehicle, and a position of a gear shift stage.

The user mode may include a first user mode changing a display state of the plurality of graphic entities during driving of the vehicle, a second user mode preventing the change of the display state during the driving of the vehicle, and a third user mode maintaining an initial value of the display state.

The UI changer may change a color of a graphic entity displayed in the background display area among the plurality of graphic entities according to the vehicle speed in the first user mode.

The UI changer may rotate the display area according to the vehicle slope in the first user mode.

The UI changer may shake the display area according to the vehicle vibration in the first user mode.

The UI changer may change or delete a graphic entity displayed in the additional information display area among the plurality of graphic entities when the driver's eye is not positioned on the display panel in the first user mode.

The UI changer may select any one of a plurality of pre-stored colors and forms when an ignition key of the vehicle is turned on in the second user mode, and change any one of the plurality of graphic entities according to the selected color or form.

The UI changer may change the color of a graphic entity displayed in the background display area among the plurality of graphic entities.

The UI changer may change the forms of graphic entities displayed in the driving information display area and the additional information display area among the plurality of graphic entities.

The UI changer may select any one of a plurality of pre-stored positions and sizes when an ignition key of the vehicle is turned on in the third user mode, and change the display area according to the selected position or size.

According to the exemplary embodiment of the present disclosure, it is possible to prevent a burn-in phenomenon by changing at least one of a position, a form, and a color of a graphic entity displayed on the liquid crystal panel according to a user mode, a dynamic characteristic of a vehicle, and a driver's eye.

DETAILED DESCRIPTION OF THE EMBODIMENTS

Figure 1:
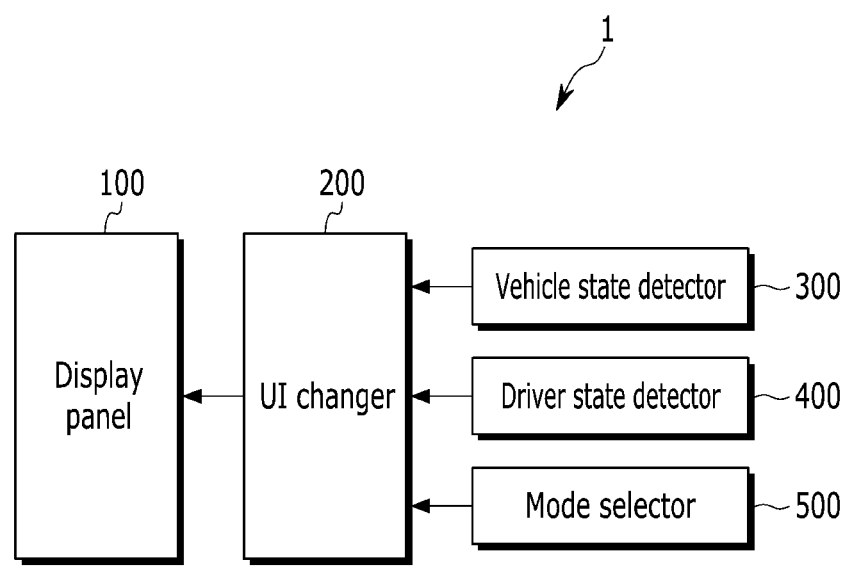
FIG. 1 is a diagram illustrating a cluster apparatus for a vehicle according to an exemplary embodiment of the present disclosure.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, the present disclosure will be described more fully hereinafter with reference to the accompanying drawings, in which exemplary embodiments of the present disclosure are shown.

Figure 2:
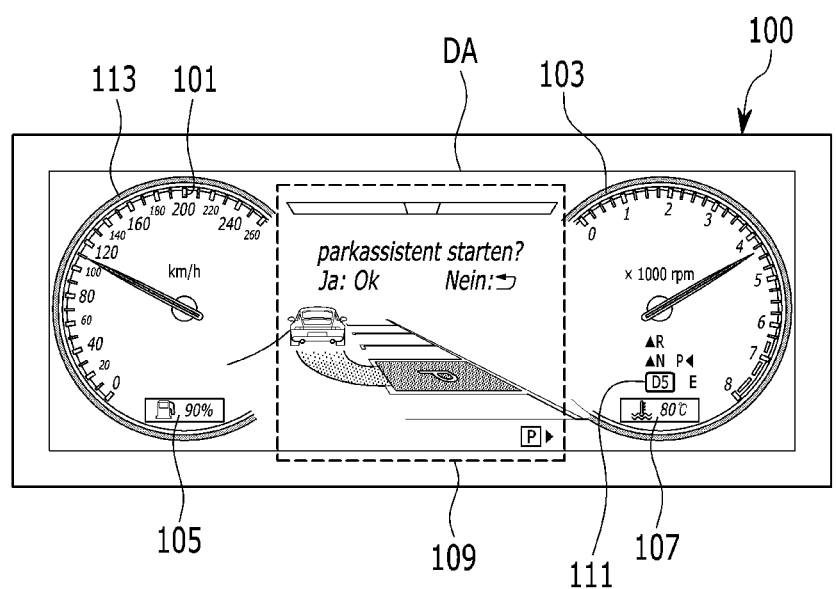
FIG. 2 is a diagram for describing a configuration of a display panel illustrated in FIG. 1.

FIG. 1 is a diagram illustrating a cluster apparatus for a vehicle according to an exemplary embodiment of the present disclosure. FIG. 2 is a diagram for describing a configuration of a display panel of FIG. 1.

Referring to FIG. 1, a cluster apparatus 1 for a vehicle according to the exemplary embodiment of the present disclosure includes a display panel 100, a user interface (UI) changer 200, a vehicle state detector 300, a driver state detector 400, and a mode selector 500.

The display panel 100 displays a plurality of graphic entities corresponding to driving information and additional information of the vehicle. Herein, the display panel 100 may configure in a thin film transistor-liquid crystal display (TFT-LCD). Further, the driving information of the vehicle includes information necessarily required for driving the vehicle, such as an engine revolution per minute (RPM), a vehicle speed, a fuel level, a coolant temperature, and warning. In addition, the additional information of the vehicle includes information other than the driving information, such as parking management, gear shift, and multimedia information.

In detail, as illustrated in FIG. 2, the display panel 100 includes a display area DA having a predetermined size. On the display area DA, a speedometer UI 101, a tachometer UI 103, a fuel system UI 105, a thermometer UI 107, a parking management UI 109, a gear stage shift UI 111, a background/edge UI 113, and the like are displayed.

Herein, the speedometer UI 101 is a graphic entity representing driving speed information of the vehicle, and the tachometer UI 103 is a graphic entity representing engine RPM information of the vehicle. The fuel system UI 105 is a graphic entity representing fuel information of the vehicle, and the thermometer UI 107 is a graphic entity representing a coolant temperature of the vehicle.

The parking management UI 109 is a graphic entity representing an operation of a parking assistant system of the vehicle, and the gear stage shift UI 111 is a graphic entity representing a current position of the gear shift stage. The background/edge UI 113 is a graphic entity representing a background and/or an edge of the speedometer UI 101, the tachometer UI 103, and the like. Herein, the background/edge UI 113 is a static UI having a fixed form, and other graphic entities are dynamic UIs which may change a form or an internal configuration. The exemplary embodiment of the present disclosure is not limited thereto, and the configuration and the form of the graphic entity disposed on the display panel 100 may be modified.

Further, in the description below, an area in which the speedometer UI 101, the tachometer UI 103, the fuel system UI 105, and the thermometer UI 107 are displayed is referred to as a driving information display area, and an area in which the parking management UI 109 and the gear stage shift UI 111 are displayed is referred to as an additional information display area. In addition, an area in which the background/edge UI 113 is displayed is referred to as a background display area.

The UI changer 200 changes at least one of a position, a form, and a color of the graphic entities according to state information of the vehicle and the driver while driving the vehicle in a first user mode.

In detail, the UI changer 200 changes the color of the graphic entity displayed in the background display area according to a speed of the vehicle. Further, the UI changer 200 changes positions of the graphic entities disposed on the driving information display area, the additional information display area, and the background display area according to a slope of the vehicle. That is, the UI changer 200 rotates the entire display area DA in response to the slope of the vehicle.

Further, the UI changer 200 shakes the graphic entities disposed on the entire display area DA, that is, the driving information display area, the additional information display area, and the background display area according to vehicle vibration. In addition, the UI changer 200 changes or deletes at least one of a position, a form, and a color of the graphic entities displayed in the additional information display area according to a driver's eye.

The UI changer 200 arbitrarily changes at least one of the color and the form of the graphic entities whenever the vehicle is turned on in a second user mode. In detail, the UI changer 200 selects any one of a plurality of pre-stored colors and forms as a random value. In addition, the UI changer 200 changes the color of the graphic entities displayed in the background display area according to the selected random value, or changes the form of the graphic entities displayed in the driving information display area and the additional information display area.

The UI changer 200 arbitrarily changes any one of the positions and sizes of the graphic entities disposed on the entire display area DA, that is, the driving information display area, the additional information display area, and the background display area, whenever the vehicle is turned on in a third user mode.

In detail, the UI changer 200 selects any one of a plurality of pre-stored positions and sizes as a random value. In addition, the UI changer 200 changes the position or the size of the display area DA according to the selected random value.

The vehicle state detector 300 detects a dynamic characteristic of the vehicle to generate vehicle state information and transfers the generated vehicle state information to the UI changer 200. Herein, the dynamic characteristic includes the speed, slope, and vibration of the vehicle, and the current position of the gear shift stage, and the like.

The driver state detector 400 detects the driver's eye to generate driver state information and transfers the generated driver state information to the UI changer 200. Herein, the driver state detector 400 may detect the user's eye by sensing a head or the eye of the driver.

The mode selector 500 is operated by the driver to select any one of the first to third user modes. Herein, the first user mode allows a change of a display state of the graphic entities while driving, and the second user mode prevents the change of the display state of the graphic entities while driving the vehicle. Further, the third user mode always prevents the change of the display state of the graphic entities of the display panel 100, that is, it is maintained in an initial state.

Hereinafter, a method of changing a position, a form, and a color of the graphic entities by the UI changer 200 according to the first to third user modes will be described in detail.

Figure 3:
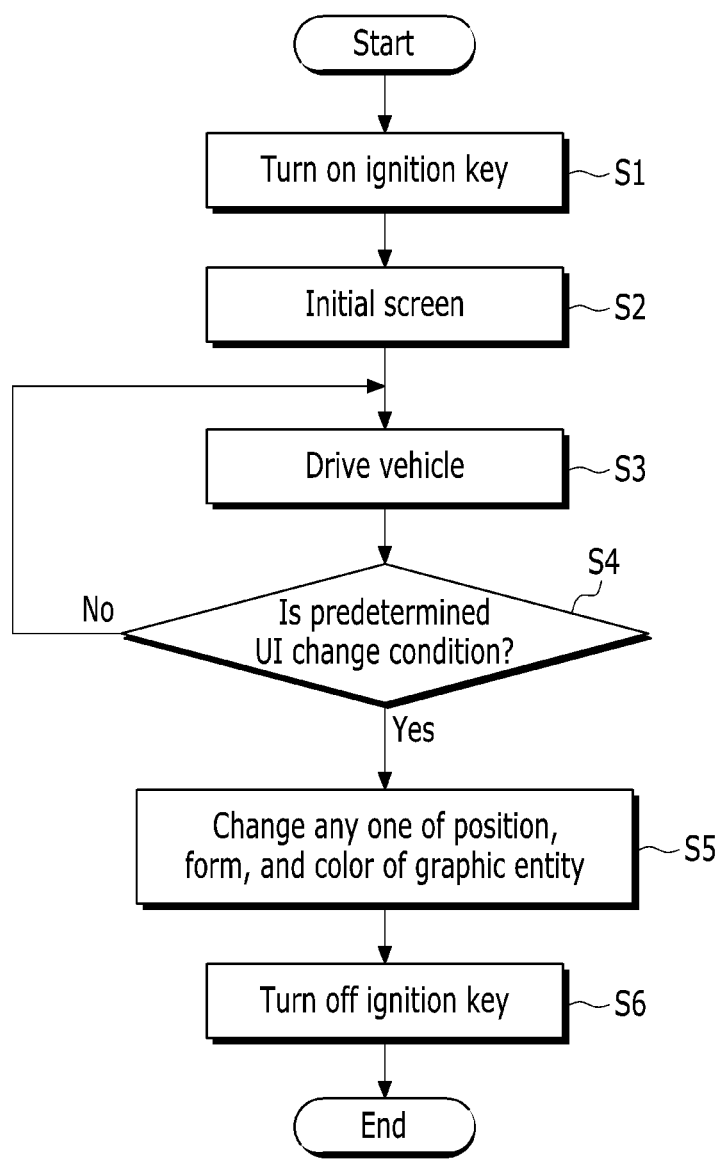
FIG. 3 is a flowchart illustrating a display method of a cluster apparatus for a vehicle in a first user mode according to an exemplary embodiment of the present disclosure.

FIG. 3 is a flowchart illustrating a display method of a cluster apparatus for a vehicle in a first user mode according to an exemplary embodiment of the present disclosure.

Referring to FIG. 3, the ignition key of the vehicle is shifted to an on state (step S1). In this case, the plurality of graphic entities of the display panel 100 is displayed in set positions, forms, and colors (step S2).

Then, the vehicle starts driving (step S3). In this case, the vehicle state detector 300 detects a dynamic characteristic of the vehicle to generate vehicle state information. Further, the driver state detector 400 detects a driver' eye to generate the driver state information.

Next, the UI changer 200 analyzes the vehicle state information and the driver state information to determine whether the state of the vehicle, and/or the driver corresponds to a reference UI change condition (step S4). Herein, the UI change condition includes threshold values of each of a speed, slope, and vibration of the vehicle, a pitch value, a threshold value of time interval when the driver's eye is not positioned on the display panel 100, a threshold value of a time interval when the driver's eye is positioned on the display panel 100, and the like.

As a result of the determination, the UI changer 200 changes at least one of positions, forms, and, colors of the graphic entities according to the vehicle state information and the driver state information, in a case where the state of the vehicle and/or the user corresponds to the reference UI change condition (step S5).

For example, the UI changer 200 may change the color of the background/edge UI 113 to red-based colors when the speed of the vehicle is accelerated at the threshold value or more, and change the color of the background/edge UI 113 to blue-based colors when the speed of the vehicle is decelerated at the threshold value or more.

The UI changer 200 may change the color of the background/edge UI 113 to green-based colors when the vehicle is driven at a constant speed. Herein, the UI changer 200 may determine that the vehicle is driven at the constant speed, that is, the vehicle is not accelerated or decelerated for about 30 minutes to 1 hour, or the position of the gear shift stage is not changed.

Figure 4A:
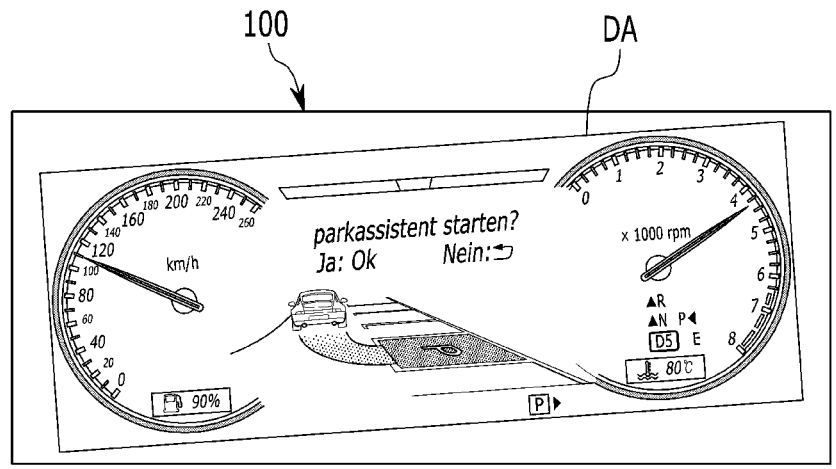
FIGS. 4A to 4C are diagrams illustrating a display state of the cluster apparatus for the vehicle in the first user mode according to the exemplary embodiment of the present disclosure.

The UI changer 200 may further rotate and display the entire display area DA by −10 degrees, as illustrated in FIG. 4A, when a roll angle of the vehicle is a threshold value or more, for example, 10 degrees. In addition, when the vibration of the vehicle is generated to a threshold value or more, the entire display area DA may be shaken for a set period of time in response to a vibration direction.

Further, the UI changer 200 may change the entire display area DA to a trapezoid shape according to a pitch value of the vehicle, or change the color of the background/edge UI 113 whenever the position of the gear shift stage is changed.

Figure 4B:
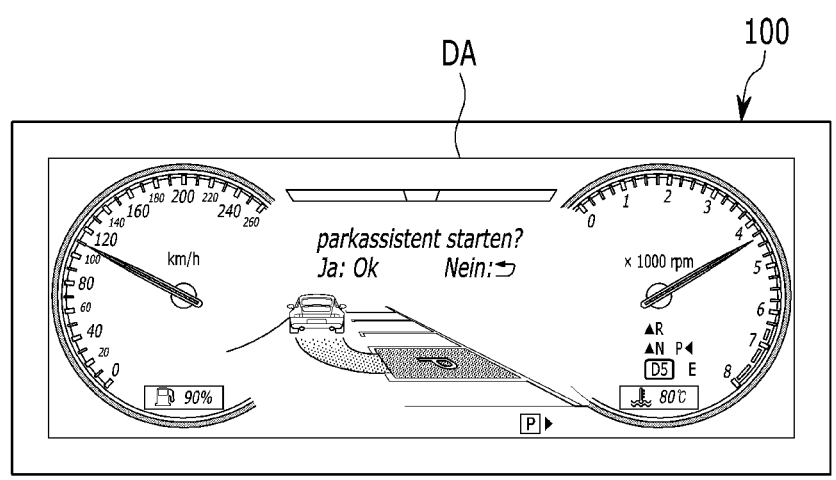
Figure 4C:
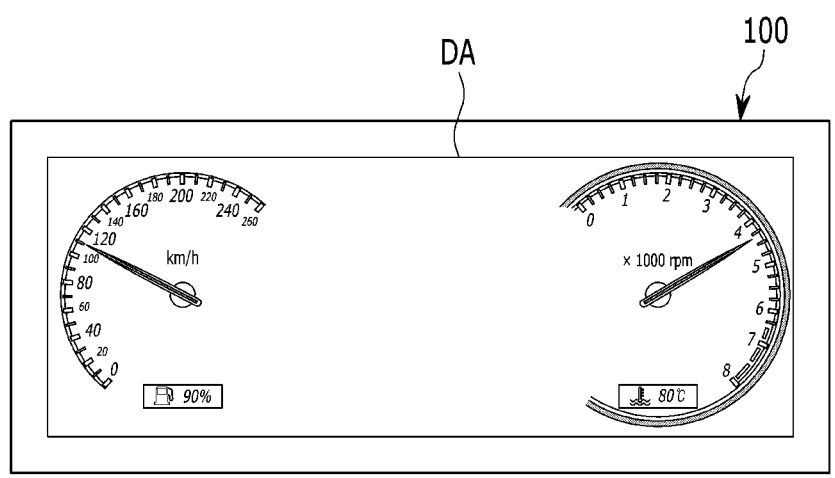

In addition, the UI changer 200 displays all the graphic entities disposed on the driving information display area, the additional information display area, and the background display area, as illustrated in FIG. 4B, when the driver's eye is positioned on the display panel 100. On the contrary, when the driver's eye is not positioned on the display panel 100 for the set period of time or more, that is, the driver continuously looks at the front, as illustrated in FIG. 4C, the graphic entities displayed on the additional information display area are deleted. In this case, the UI changer 200 may change at least one of a position, form, and color of the graphic entities displayed in the additional information display area. Next, the ignition key of the vehicle is shifted to an off state (step S5).

That is, the UI changer 200 continuously changes at least one of the position, the form, and the color of the graphic entity of the display panel 100 according to the vehicle state or the driver state in the first user mode. As a result, a burn-in phenomenon of the display panel 100 may be prevented.

Figure 5:
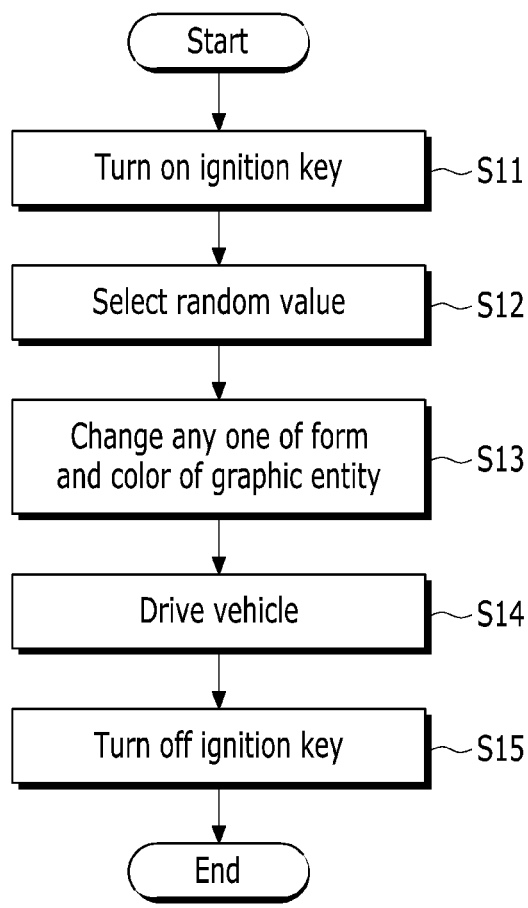
FIG. 5 is a flowchart illustrating a display method of a cluster apparatus for a vehicle in a second user mode according to an exemplary embodiment of the present disclosure.

FIG. 5 is a flowchart illustrating a display method of a cluster apparatus for a vehicle in a second user mode according to an exemplary embodiment of the present disclosure.

Referring to FIG. 5, an ignition key of the vehicle is shifted to an on state (step S11). The UI changer 200 selects at least one of a plurality of colors and forms as a random value (step S12). Next, the UI changer 200 changes the graphic entity of the display panel 100 according to the selected random value (step S13).

Figure 6A:
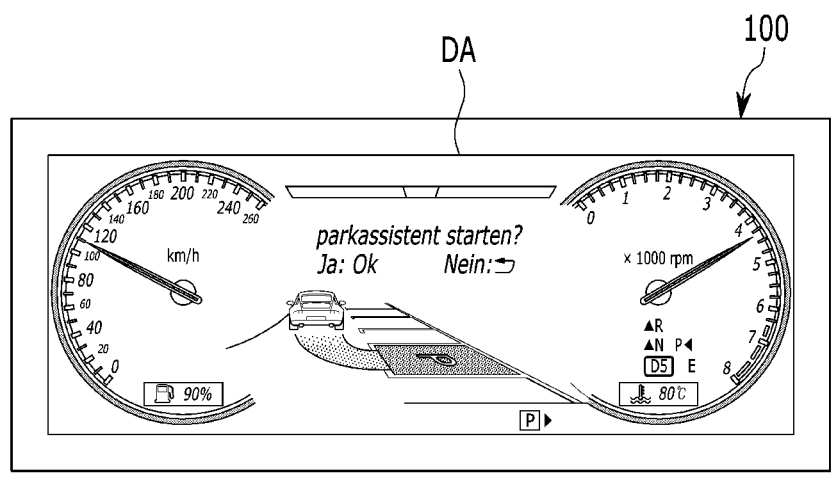
FIGS. 6A and 6b are diagrams illustrating a display state of the cluster apparatus for the vehicle in the second user mode according to the exemplary embodiment of the present disclosure.
Figure 6A:
Figure 6A:
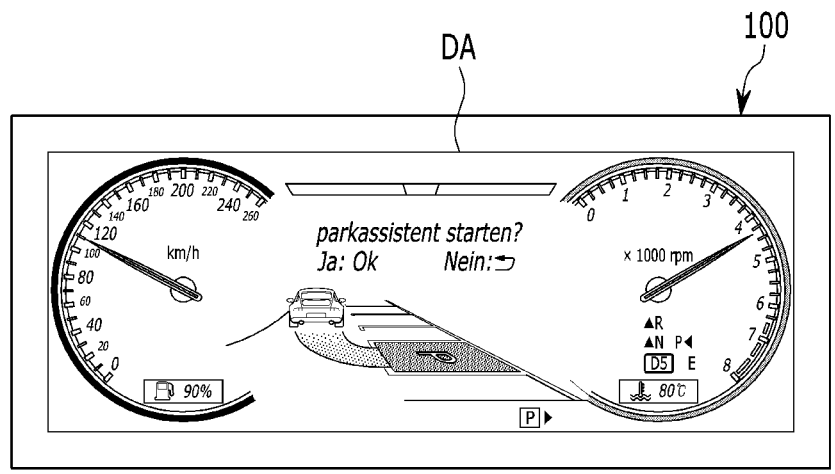
Figure 6B:
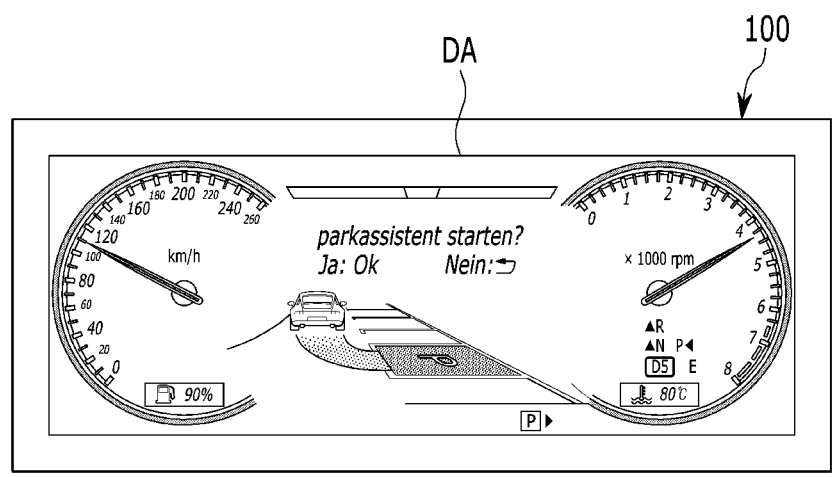
Figure 6B:
Figure 6B:
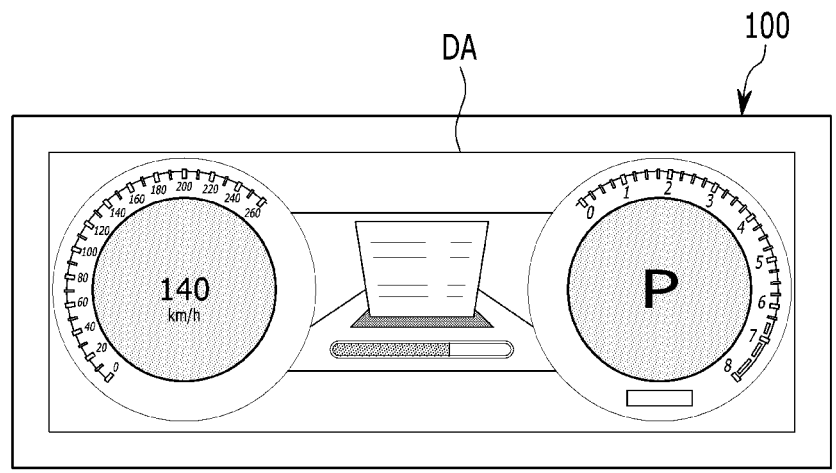

For example, as illustrated in FIG. 6A, the forms of the graphic entities in the driving information display area and the additional information display area are not changed, but the colors of the graphic entities in the background display area may be changed. Further, as illustrated in FIG. 6B, the forms of the graphic entities in the driving information display area and the additional information display area may be changed.

Next, the driving of the vehicle starts (step S14), and the UI changer 200 maintains the form or the color of the graphic entity changed in step S13. Next, the ignition key of the vehicle is shifted to an off state (step S15).

That is, the UI changer 200 pre-changes the graphic entities to any color or form whenever the vehicle starts before the driving of the vehicle in the second user mode. As a result, the burn-in phenomenon of the display panel 100 may be prevented without changing the graphic entities during the driving of the vehicle.

Figure 7:
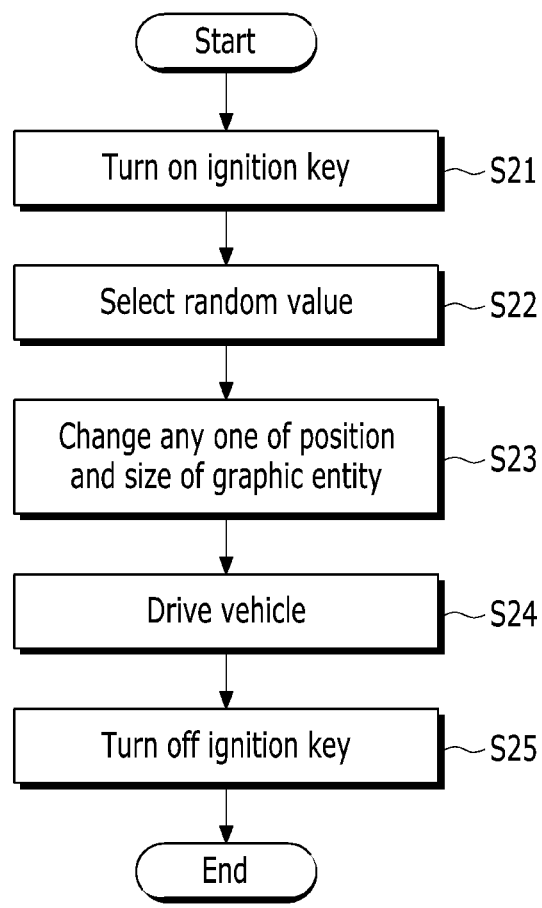
FIG. 7 is a flowchart illustrating a display method of a cluster apparatus for a vehicle in a third user mode according to an exemplary embodiment of the present disclosure.

FIG. 7 is a flowchart illustrating a display method of a cluster apparatus for a vehicle in a third user mode according to an exemplary embodiment of the present disclosure.

Referring to FIG. 7, an ignition key of the vehicle is shifted to an on state (step S21). The UI changer 200 selects at least one of a plurality of positions and sizes as a random value (step S22). Herein, a position of the display area DA may include a central coordinate value of the display area DA. Next, the UI changer 200 changes any one of the positions and sizes of the entire display area DA of the display panel 100 according to the selected random value (step S23).

Figure 8A:
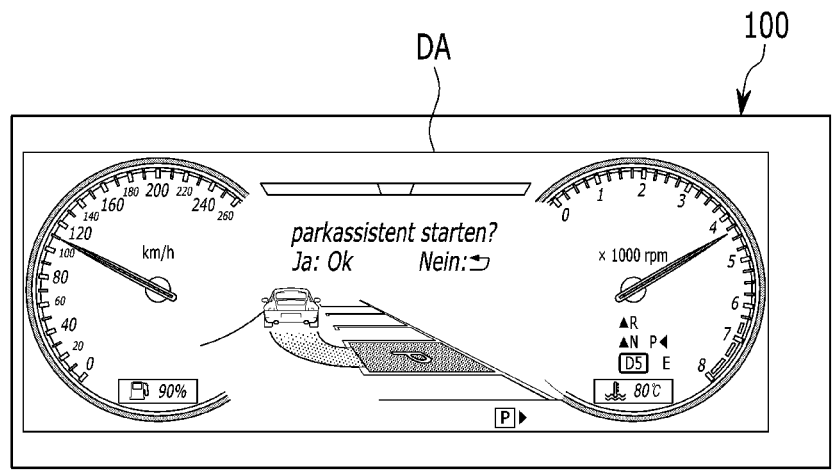
FIGS. 8A and 8B are diagrams illustrating a display state of the cluster apparatus for the vehicle in the third user mode according to the exemplary embodiment of the present disclosure.
Figure 8B:
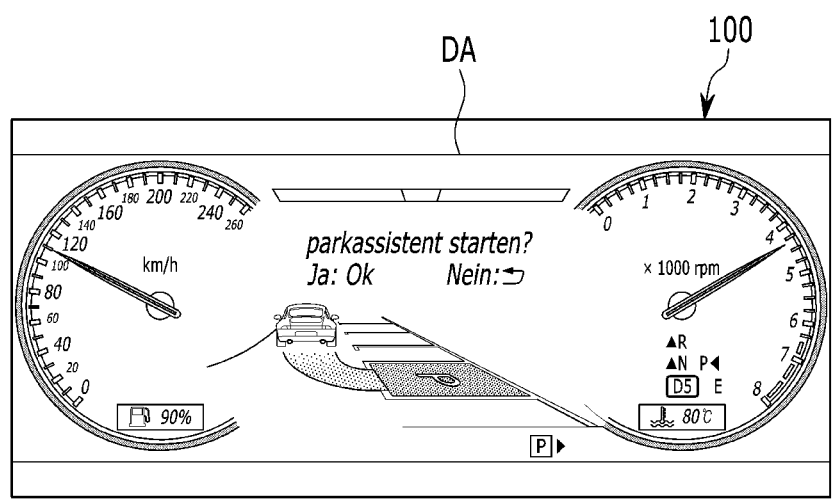

For example, the UI changer 200 may move the position of the display area DA in a left direction as illustrated in FIG. 8A. Further, the UI changer 200 may move the display area DA in a right direction, an upper direction, a lower direction, a lower right direction, an upper left direction, and the like. In addition, the UI changer 200 may expand the display area DA in a horizontal direction of the display area DA, as illustrated in FIG. 8B. The UI changer 200 may change a size by reducing, enlarging, and vertically expanding the display area DA.

Next, the driving of the vehicle starts (step S24), and the UI changer 200 maintains the form or the color of the graphic entities changed in step S13. The ignition key of the vehicle is then shifted to an off state (step S25).

According to the present disclosure, the UI changer 200 changes the position or the size of the display area DA whenever the vehicle starts before the running in the third user mode so that the burn-in phenomenon of the display panel 100 is prevented, and simultaneously, the change of the display state of the display area DA may not be recognized by the driver.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cluster apparatus for a vehicle, comprising:
a display panel in which a plurality of graphic entities corresponding to driving information, additional information, a background, and an edge are displayed on a display area, including a driving information display area, an additional information display area, and a background display area;
a sensor configured to detect a dynamic characteristic of the vehicle to generate vehicle state information and to detect a driver's eye on the vehicle to generate driver state information; and
a processor configured to change any one of the plurality of graphic entities and the display area according to a user mode selected by a driver, the vehicle state information, and the driver state information,
wherein the user mode includes a first user mode changing a display state of the plurality of graphic entities during driving of the vehicle, a second user mode preventing the change of the display state during the driving of the vehicle, and a third user mode maintaining an initial value of the display state,
wherein, when the user mode is the first user mode, initial graphic entities are initially displayed and the processor changes at least one of the plurality of the graphic entities according to the vehicle state information and the driver state information,
wherein, when the user mode is the second user mode, the processor selects any one of a plurality of pre-stored colors and forms if an ignition key is turned on and changes a color and a form of at least one of the plurality of graphic entities into the selected color and form, and wherein, when the user mode is the third user mode, the processor selects any one of a plurality of pre-stored positions and sizes if the ignition key is turned on and changes a position and a size of at least one of the plurality of graphic entities into the selected position and size; wherein, the processor is configured to change or delete a graphic entity displayed in the additional information display area among the plurality of graphic entities when the driver's eye is not positioned on the display panel in the first user mode.

2. The cluster apparatus of claim 1, wherein:
the display panel includes a liquid crystal display panel.

3. The cluster apparatus of claim 1, wherein:
the dynamic characteristic includes a speed, slope, and vibration of the vehicle and a position of a gear shift stage.

4. The cluster apparatus of claim 1, wherein:
the processor is configured to change a color of a graphic entity displayed in the background display area among the plurality of graphic entities according to the vehicle speed in the first user mode.

5. The cluster apparatus of claim 1, wherein:
the processor is configured to rotate the display area according to the vehicle slope in the first user mode.

6. The cluster apparatus of claim 1, wherein:
the processor is configured to shake the display area according to the vehicle vibration in the first user mode.

7. The cluster apparatus of claim 1, wherein:
the processor is configured to change the color of a graphic entity displayed in the background display area among the plurality of graphic entities.

8. The cluster apparatus of claim 1, wherein:
the processor is configured to change the forms of graphic entities displayed in the driving information display area and the additional information display area among the plurality of graphic entities.

* * * * *